(12) United States Patent
Neudecker et al.

(10) Patent No.: US 11,784,302 B2
(45) Date of Patent: Oct. 10, 2023

(54) LITHIUM-METAL BATTERIES HAVING IMPROVED DIMENSIONAL STABILITY AND METHODS OF MANUFACTURE

(71) Applicant: Apple Inc., Cupertino, CA (US)

(72) Inventors: Bernd J. Neudecker, Los Gatos, CA (US); Shawn W. Snyder, Santa Clara, CA (US); Richard M. Mank, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 17/097,777

(22) Filed: Nov. 13, 2020

(65) Prior Publication Data

US 2021/0066693 A1  Mar. 4, 2021

Related U.S. Application Data

(63) Continuation of application No. 15/384,764, filed on Dec. 20, 2016, now Pat. No. 10,868,290.
(Continued)

(51) Int. Cl.
| | |
|---|---|
| *H01M 4/134* | (2010.01) |
| *H01M 4/38* | (2006.01) |
| *H01M 4/1395* | (2010.01) |
| *H01M 10/052* | (2010.01) |
| *H01M 4/66* | (2006.01) |
| *H01M 10/058* | (2010.01) |
| *H01M 10/04* | (2006.01) |

(52) U.S. Cl.
CPC ......... *H01M 4/134* (2013.01); *H01M 4/1395* (2013.01); *H01M 4/382* (2013.01); *H01M 4/661* (2013.01); *H01M 10/052* (2013.01); *H01M 10/058* (2013.01); *H01M 10/0445* (2013.01)

(58) Field of Classification Search
CPC .............................. H01M 4/134; H01M 4/382
See application file for complete search history.

(56) References Cited

U.S. PATENT DOCUMENTS

| | | |
|---|---|---|
| 5,478,668 A | 12/1995 | Gozdz et al. |
| 5,910,382 A | 6/1999 | Goodenough et al. |
| (Continued) | | |

FOREIGN PATENT DOCUMENTS

| | | |
|---|---|---|
| CN | 1314008 | 9/2001 |
| CN | 1508899 | 6/2004 |
| (Continued) | | |

*Primary Examiner* — Stephan J Essex
(74) *Attorney, Agent, or Firm* — BakerHostetler

(57) ABSTRACT

Lithium-metal batteries with improved dimensional stability are presented along with methods of manufacture. The lithium-metal batteries incorporate an anode cell that reduces dimensional changes during charging and discharging. The anode cell includes a container having a first portion and a second portion to form an enclosed cavity. The first portion is electrically-conductive and chemically-stable to lithium metal. The second portion is permeable to lithium ions and chemically-stable to lithium metal. The anode cell also includes an anode comprising lithium metal and disposed within the cavity. The anode is in contact with the first portion and the second portion. The cavity is configured such that volumetric expansion and contraction of the anode during charging and discharging is accommodated entirely therein.

18 Claims, 8 Drawing Sheets

Related U.S. Application Data

(60) Provisional application No. 62/300,279, filed on Feb. 26, 2016.

(56) References Cited

U.S. PATENT DOCUMENTS

| | | |
|---|---|---|
| 5,916,707 A | 6/1999 | Omaru et al. |
| 6,040,078 A | 3/2000 | Fauteux et al. |
| 6,224,995 B1 | 5/2001 | Fauteux et al. |
| 6,432,574 B1 | 8/2002 | Suzuki et al. |
| 6,991,873 B2 | 1/2006 | Sakai et al. |
| 7,092,746 B2 | 8/2006 | Infanti |
| 7,432,018 B2 | 10/2008 | Taguchi |
| 8,440,938 B2 | 5/2013 | Chami et al. |
| 8,592,065 B2 | 11/2013 | Bhardwaj et al. |
| 8,940,429 B2 | 1/2015 | Spare |
| 9,276,287 B2 | 3/2016 | Bhardwaj et al. |
| 10,135,097 B2 | 11/2018 | Spare |
| 2001/0005561 A1 | 6/2001 | Yamada et al. |
| 2001/0019795 A1 | 9/2001 | Yoshida et al. |
| 2002/0150816 A1 | 10/2002 | Sakai et al. |
| 2002/0157242 A1 | 10/2002 | Fukuda et al. |
| 2003/0077509 A1 | 4/2003 | Probst et al. |
| 2003/0148173 A1 | 8/2003 | Gu |
| 2003/0232236 A1 | 12/2003 | Mitchell et al. |
| 2004/0033416 A1 | 2/2004 | Kim et al. |
| 2004/0119442 A1 | 6/2004 | Lee et al. |
| 2004/0127952 A1 | 7/2004 | O'Phelan et al. |
| 2005/0188533 A1 | 9/2005 | Righi et al. |
| 2005/0272479 A1 | 12/2005 | Infanti |
| 2005/0287437 A1 | 12/2005 | Fukumine et al. |
| 2006/0024572 A1 | 2/2006 | Lee |
| 2006/0105237 A1 | 5/2006 | Oh |
| 2006/0127762 A1 | 6/2006 | Gyenes et al. |
| 2006/0154145 A1 | 7/2006 | Lee et al. |
| 2006/0210872 A1 | 9/2006 | Yageta et al. |
| 2007/0031733 A1 | 2/2007 | Kogetsu et al. |
| 2007/0051620 A1* | 3/2007 | Visco .................. H01M 4/366 204/291 |
| 2007/0105014 A1 | 5/2007 | Shin et al. |
| 2007/0231683 A1 | 10/2007 | Lee et al. |
| 2008/0153000 A1 | 6/2008 | Salot et al. |
| 2008/0248386 A1 | 10/2008 | Obrovac |
| 2009/0029246 A1 | 1/2009 | Kim |
| 2009/0095808 A1 | 4/2009 | Naccache |
| 2009/0117462 A1 | 5/2009 | Okazaki et al. |
| 2009/0159582 A1 | 6/2009 | Chami et al. |
| 2009/0197162 A1 | 8/2009 | Shinyashiki et al. |
| 2009/0202908 A1 | 8/2009 | Sumihara et al. |
| 2009/0239133 A1 | 9/2009 | Chinichiro |
| 2009/0248356 A1 | 10/2009 | Kriegmair |
| 2010/0047685 A1 | 2/2010 | Lee et al. |
| 2010/0167111 A1 | 7/2010 | Sumihara et al. |
| 2011/0064991 A1 | 3/2011 | Ahn |
| 2011/0123844 A1 | 5/2011 | Bhardwaj et al. |
| 2011/0183183 A1 | 7/2011 | Grady et al. |
| 2011/0269007 A1 | 11/2011 | Visco et al. |
| 2012/0015223 A1 | 1/2012 | Bhardwaj et al. |
| 2012/0121965 A1 | 5/2012 | Makino et al. |
| 2012/0177953 A1 | 7/2012 | Bhardwaj et al. |
| 2013/0252053 A1 | 9/2013 | Woo |
| 2013/0302674 A1 | 11/2013 | Stern et al. |
| 2014/0065457 A1 | 3/2014 | Bhardwaj et al. |
| 2014/0113184 A1 | 4/2014 | Hamel et al. |
| 2014/0170467 A1 | 6/2014 | Kwon et al. |
| 2014/0195066 A1 | 7/2014 | Nanda et al. |
| 2014/0322575 A1 | 10/2014 | Hwang et al. |
| 2015/0044536 A1 | 2/2015 | Kwon et al. |
| 2015/0207111 A1 | 7/2015 | Tao |
| 2015/0214578 A1 | 7/2015 | Spare |
| 2016/0013455 A1 | 1/2016 | Shiu et al. |
| 2016/0293996 A1 | 10/2016 | Bhardwaj et al. |
| 2017/0092925 A1 | 3/2017 | Shiu et al. |
| 2017/0125849 A1 | 5/2017 | Bhardwaj et al. |

FOREIGN PATENT DOCUMENTS

| | | |
|---|---|---|
| CN | 1599099 | 3/2005 |
| CN | 1780036 | 5/2006 |
| CN | 1808753 | 7/2006 |
| CN | 201038228 | 3/2008 |
| CN | 201122626 | 9/2008 |
| CN | 101411005 | 4/2009 |
| CN | 101485032 | 7/2009 |
| CN | 101523656 | 9/2009 |
| CN | 101542817 | 9/2009 |
| CN | 201387915 | 1/2010 |
| CN | 102047465 | 5/2011 |
| CN | 102237508 | 11/2011 |
| CN | 102340021 | 2/2012 |
| CN | 102881914 | 1/2013 |
| CN | 103443965 | 12/2013 |
| EP | 1102336 | 5/2001 |
| EP | 1195838 | 4/2002 |
| EP | 1569252 | 8/2005 |
| EP | 1895610 | 3/2008 |
| EP | 2325929 | 5/2011 |
| EP | 2654102 | 10/2013 |
| JP | 63-33543 | 12/1994 |
| JP | 1997-82361 | 3/1997 |
| JP | H09-259859 | 10/1997 |
| JP | 2000-021453 | 1/2000 |
| JP | 2000-285881 | 10/2000 |
| JP | 2001-028275 | 1/2001 |
| JP | 2001-273930 | 10/2001 |
| JP | 2003-234094 | 8/2003 |
| JP | 2004-111219 | 4/2004 |
| JP | 2005-011660 | 1/2005 |
| JP | 2005-228573 | 8/2005 |
| JP | 2008-066089 | 3/2008 |
| JP | 2008-123955 | 5/2008 |
| JP | 2009-152204 | 7/2009 |
| JP | 2012-018795 | 1/2012 |
| JP | 2013-62137 | 4/2013 |
| JP | 2013-098080 | 5/2013 |
| KR | 2003-0066960 | 8/2003 |
| KR | 10-2006-28184 | 3/2006 |
| KR | 2007-0096280 | 10/2007 |
| KR | 100883922 | 10/2007 |
| KR | 2008-0019311 | 3/2008 |
| KR | 100905390 | 3/2008 |
| KR | 10-2009-0045365 | 5/2009 |
| KR | 10-2014-0015647 | 2/2014 |
| TW | I260101 | 8/2006 |
| TW | I283941 | 7/2007 |
| TW | M332265 | 5/2008 |
| TW | M341313 | 9/2008 |
| TW | M363159 | 8/2009 |
| TW | 201230439 | 7/2012 |
| TW | 201230447 | 7/2012 |
| TW | 201230457 | 7/2012 |
| TW | 201232877 | 8/2012 |
| WO | WO-2005076389 A2 * | 8/2005 ............. H01M 4/04 |
| WO | WO 2005/074057 | 11/2005 |
| WO | WO 2005/117189 | 12/2005 |
| WO | WO 2010/022669 | 4/2010 |
| WO | WO 2011/092486 | 8/2011 |
| WO | WO 2011/115464 | 9/2011 |
| WO | WO 2012/009423 | 1/2012 |
| WO | WO 2012/060972 | 5/2012 |
| WO | WO 2012/086793 | 6/2012 |

* cited by examiner

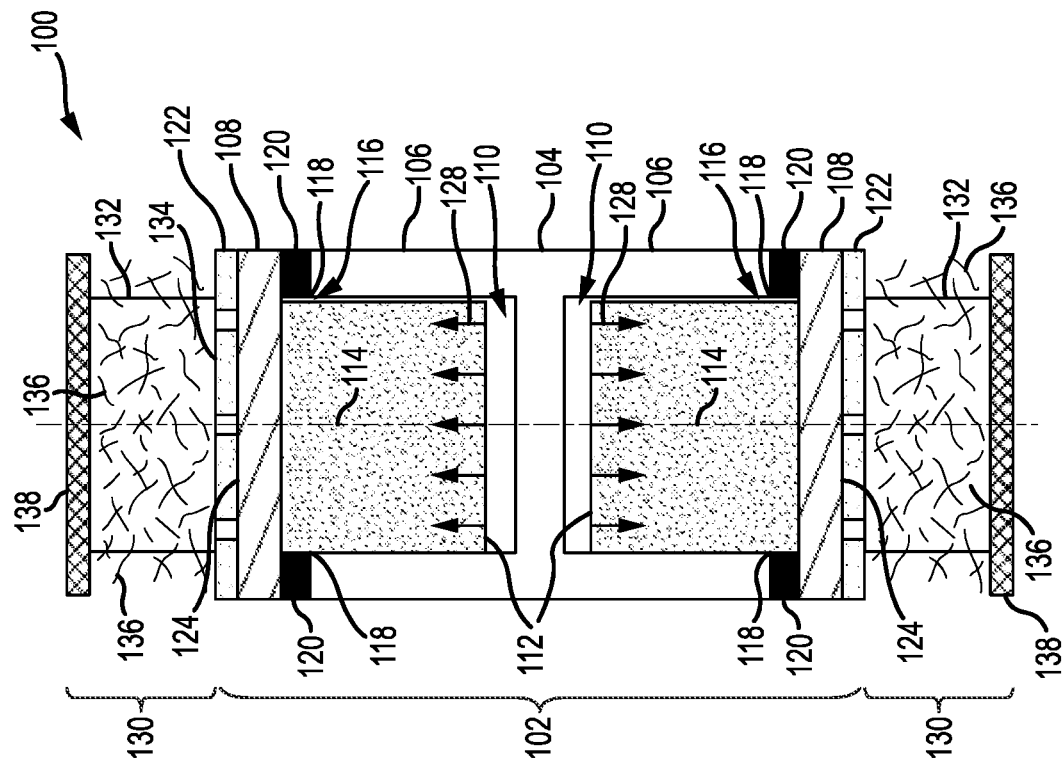
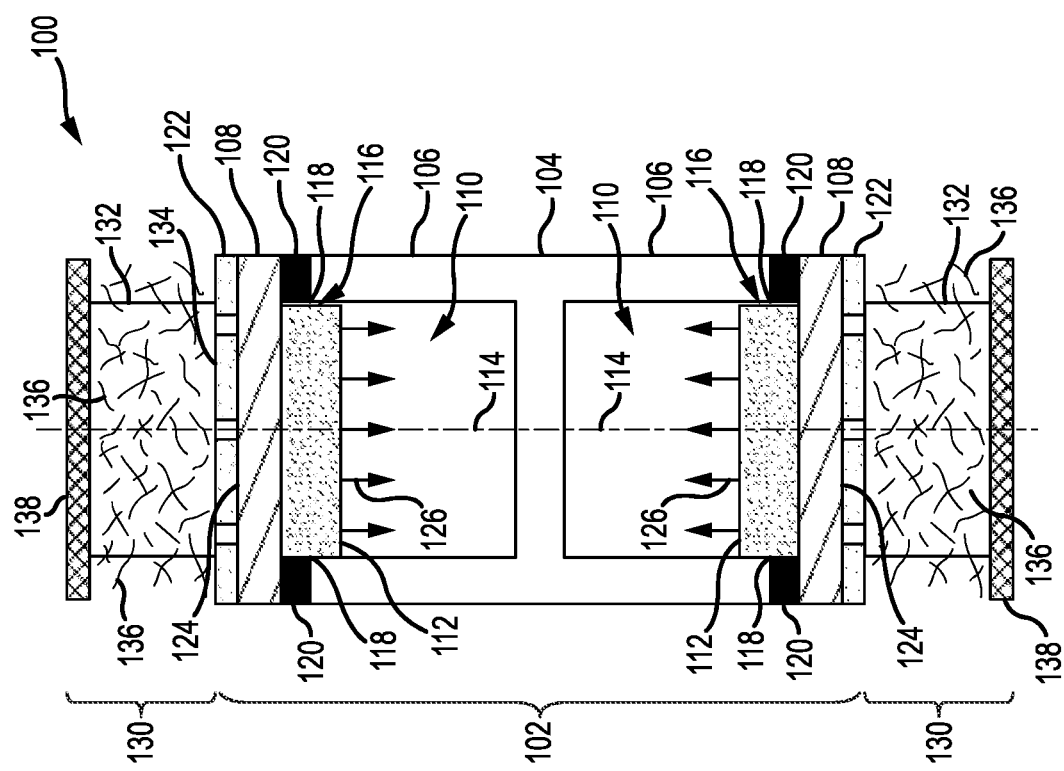

LITHIUM-METAL BATTERIES HAVING IMPROVED DIMENSIONAL STABILITY AND METHODS OF MANUFACTURE

CROSS-REFERENCE TO RELATED APPLICATION(S)

The present application is a continuation of U.S. patent application Ser. No. 15/384,764, entitled "Lithium-Metal Batteries Having Improved Dimensional Stability and Methods of Manufacture," filed on Dec. 20, 2016, which claims the benefit under 35 U.S.C. § 119(e) of U.S. Provisional Appl. No. 62/300,279, entitled "Lithium-Metal Batteries Having Improved Dimensional Stability and Methods of Manufacture," filed on Feb. 26, 2016, each of which is incorporated herein by reference in its entirety.

FIELD

This disclosure relates generally to lithium-metal batteries, and more particularly, to anode cells that allow for improved dimensional stability of lithium-metal batteries.

BACKGROUND

During operation, lithium-metal batteries often undergo cycling processes, which include charging and discharging. During charging, an anode of a lithium-metal battery is continuously plated with lithium metal. During discharging, the anode is continuously stripped of lithium metal. The anode experiences volumetric expansion and contraction in response to, respectively, plating and stripping of lithium metal. Such volumetric expansion and contraction produces undesirable dimensional changes within an anode cell. These dimensional changes are typically concomitant with material stresses, which may reduce the performance of the lithium-metal battery or cause premature failure.

Lithium-metal batteries may sometimes be arranged in a stacked sequence. In the stacked sequence, however, volumetric expansion and contraction occurs cumulatively: each lithium-metal battery contributes in additive fashion to a larger, effective dimensional change. This larger, effective dimensional change typically requires void space to be reserved within a target application (e.g., a battery package or a battery-powered apparatus). Reserved void space represents an undesirable loss of functional volume within the target application.

The battery industry seeks lithium-metal batteries that have improved dimensional stability.

SUMMARY

The embodiments described herein relate to lithium-metal batteries having anode cells for reducing dimensional changes during battery cycling. Each anode cell provides an enclosed cavity that contains an anode comprising lithium metal. The enclosed cavity is capable of accommodating all expansion and contraction volumes of the anode during charging and discharging. Each anode cell also includes a solid-state lithium ion conductor that defines a portion of the enclosed cavity (e.g., a lid). Via the portion, the anode cell is coupled electrochemically to a cathode cell to form a lithium-metal battery. In this coupled configuration, the anode cell separates the anode from an electrolyte allowing useful formulations of the electrolyte that would otherwise react with the anode. Such separation may also prevent a formation of lithium-metal dendrites, which can traverse the electrolyte to form a short-circuit pathway between the anode cell and the cathode cell.

In various lithium-metal batteries, the anode cell includes a container having a first portion and a second portion to form an enclosed cavity. In some variations, the second portion forms one side of the enclosed cavity. The first portion is electrically-conductive and chemically-stable to lithium metal. The second portion is permeable to lithium ions and chemically-stable to lithium metal. The anode cell also includes an anode comprising lithium metal and disposed within the cavity. The anode is in contact with the first portion and the second portion. The cavity is configured such that volumetric expansion and contraction of the anode during charging and discharging is accommodated entirely therein.

The lithium-metal batteries described herein may also be incorporated into battery packs. These battery packs include at least one lithium-metal battery having an anode cell electrochemically-coupled to a cathode cell. The anode cell is as described previously and the cathode cell may be any cathode cell that utilizes lithium ions as a basis for electrochemical operation. In some embodiments, the at least one lithium-metal battery includes a plurality of lithium-metal batteries arranged in a stacked sequence. The stacked sequence alternates between a first junction formed by adjacent pairs of anode cells and a second junction formed by adjacent pairs of cathode cells. In other embodiments, the at least one lithium-metal battery includes an array of lithium-metal batteries. In these embodiments, the first portion of the container for each lithium-metal battery defines a section of an extended first portion shared in common. Other arrangements of the least one lithium-metal are described for battery packs.

The lithium-metal batteries may be manufactured using a method that includes the step of depositing a seed layer of lithium metal onto a surface of a substrate. The seed layer covers a predetermined area of the surface, which matches an orifice of a cavity within an electrically-conductive container. The substrate includes a solid-state lithium-ion conductor. The method also includes the step of coupling the electrically-conductive container to the substrate so as to enclose the seed layer within the cavity. Such enclosure includes the seed layer being seated within a perimeter of the orifice. The seed layer is in contact with the electrically-conductive container. Other methods of manufacturing the lithium-metal batteries are described.

BRIEF DESCRIPTION OF THE DRAWINGS

The disclosure will be readily understood by the following detailed description in conjunction with the accompanying drawings, wherein like reference numerals designate like structural elements, and in which:

FIG. 1A is a cross-sectional view of a lithium-metal battery, during a charging process, with an anode cell for reducing dimensional changes during battery cycling, according to an illustrative embodiment.

FIG. 1B is a cross-sectional view of the lithium-metal battery of FIG. 1A, but during a discharging process, according to an illustrative embodiment.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Now referring to FIGS. 1A & 1B, a cross-sectional view is presented of a lithium-metal battery 100 having an anode cell 102 for reducing dimensional changes during battery cycling, according to an illustrative embodiment. FIG. 1A corresponds to the lithium-metal battery 100 during a charging process and FIG. 1B corresponds to the lithium-metal battery 100 during a discharging process. In some embodiments, such as that shown in FIGS. 1A & 1B, an electrically-conductive portion of the anode cell 102 functions as an anode current collector for the lithium-metal battery 100. In other embodiments, the anode cell 102 is electrically-coupled to an anode current collector.

Figure 1C:
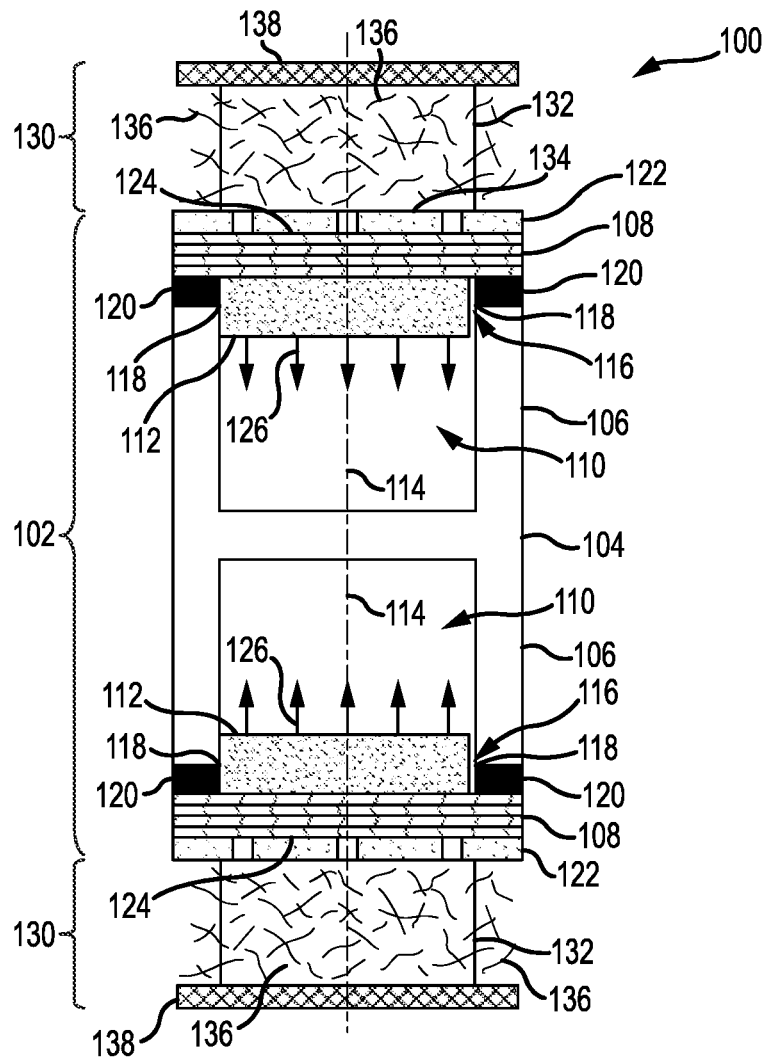
FIG. 1C is a cross-sectional view of the lithium-metal battery of FIG. 1C, but in which the second portion includes a multilayer stack, according to an illustrative embodiment.

The anode cell 102 includes a container 104 having a first portion 106 and a second portion 108 to form an enclosed cavity 110. In the embodiment of FIGS. 1A and 1B, the second portion 108 forms a single wall of the enclosed cavity 110, and the first portion 106 forms the other walls. The first portion 106 is electrically-conductive and chemically-stable to lithium metal. The second portion 108 is permeable to lithium ions and chemically-stable to lithium metal. In some embodiments, the second portion 108 includes a lid (or serves as a lid) for the first portion 106. In some embodiments, such as that depicted in FIG. 1C, the second portion 108 includes a multilayer stack. In these embodiments, materials of the multilayer stack and their arrangement may be chosen so as to avoid a dendritic growth of lithium metal through the second portion 108.

The anode cell 102 also includes an anode 112 comprising lithium metal and disposed within the enclosed cavity 110. The anode 112 is in contact with the first portion 106 and the second portion 108. Such contact allows a flow of electrons (i.e., via the first portion 104) and a mass transport of lithium ions (i.e., via the second portion 108) during operation. The enclosed cavity 110 is configured such that volumetric expansion and contraction of the anode 112 during charging and discharging is accommodated entirely therein.

The first portion 106 of the container 104 may be formed of electrically-conductive material that is non-reactive towards lithium metal, such as Cu, Ni, Fe, Co, Mn, Cr, V, Mo, W, Nb, and Ta. Alternatively, the first portion 106 may be formed of electrically-conductive material having one or more protective coatings that are non-reactive towards lithium metal. Such protective coatings may themselves be conductive or be applied in areas so that an overall electrical conductivity of the first portion 106 is maintained. Other types of composite configurations are possible for the first portion 106.

The enclosed cavity 110 may exhibit various geometries such as cylindrical volumes, rectangular volumes, and hemispherical volumes. Non-symmetrical volumes can also be used. In some embodiments, the enclosed cavity 110 has a cross-sectional area that is constant along its longitudinal axis 114. In some embodiments, the enclosed cavity 110 includes an orifice 116 having a perimeter 118 that defines the cross-sectional area of the enclosed cavity 110. In some embodiments, such as that shown in FIGS. 1A & 1B, the cross-sectional area is constant along its longitudinal axis 114 and is defined by the perimeter 118 of the orifice 116.

As depicted in FIGS. 1A & 1B, the first portion 106 has two enclosed cavities 110 arranged in a "back-to-back" configuration. The corresponding orifices 116 face in opposite directions. However, this depiction is not intended as limiting. The first portion 106 may have any number of enclosed cavities 110 arranged in any type of configuration. The orifices 116 may face any direction. For example, and without limitation, the orifices 116 may be canted relative to each other to form patterns (e.g., peaks, valleys, clusters, etc.). In another non-limiting example, the orifices 116 may be grouped into rows, each row tilted such that orifices 116 therein face a common direction. It will be appreciated that, for a plurality of enclosed cavities 110, the corresponding volumes may be different in geometry, scale, or any combination thereof.

The second portion 108 may form a single body with the first portion 106, or as shown in FIGS. 1A & 1B, be coupled to the first portion 106 as a second body. In some embodiments, the second portion 108 is coupled to the first portion 106 via a seal 120 around the perimeter 118 of the orifice 116. The seal 120 protects a volume within the enclosed cavity 110 by excluding contaminants from an environment of the anode cell 102 (e.g., an electrolyte). The seal 120 may include a bonding compound that is chemically-stable with respect to lithium metal, the first portion 106, and the second portion 108. In some embodiments, the seal 120 includes a copolymer of ethylene and methacrylic acid. The copolymer may incorporate metal ions such as zinc, sodium, lithium, and potassium. Other additives are possible for the copolymer.

In some embodiments, the second portion 108 may include a solid-state lithium-ion conductor. Non-limiting examples of the solid-state lithium-ion conductor include a lithium phosphorus oxynitride material (e.g., LiPON), a lithium boron oxynitride material (e.g., LiBON), a lithium boron oxide material (e.g., $LiBO_3$), a lithium niobium oxide material (e.g., $LiNbO_3$), a lithium lanthanum zirconium oxide material (e.g., $Li_7La_3Zr_2O_{12}$), a lithium phosphorus sulfide material (e.g., $Li_3PS_4$), a lithium tin sulfide material (e.g., $Li_4SnS_4$), and a lithium germanium phosphorus sulfide material (e.g., $Li_{10}GeP_2S_{12}$). Other solid-state lithium-ion conductors are possible. In further embodiments, the solid-state lithium-ion conductor has a lithium-ion conductivity greater than 10'S/cm. In some embodiments, the second portion 108 includes a lithium phosphorus oxynitride material. The lithium phosphorus oxynitride material may have a stoichiometry of $Li_xPO_yN_z$ where $3.0 \leq x \leq 3.8$, $3.0 \leq y \leq 4.0$, and $0.1 \leq z \leq 1.0$. The lithium phosphorus oxynitride material may be amorphous.

In some embodiments, a permeable membrane 122 is disposed along an exterior surface 124 of the second portion 108 and opposite the orifice 116. The permeable membrane 122 may extend along the exterior surface 124 to portions of the second portion 108 not immediately opposite the orifice 116. The permeable membrane may be any type of permeable membrane configured to transport lithium-ions therethrough, including separators for lithium-ion batteries. In some embodiments, the permeable membrane 122 exhibits a mean pore diameter less than 0.8 μm. Non-limiting examples of the permeable membrane 122 include polymer membranes of polyethylene (PE) and polypropylene (PP). Such polymer membranes may also include multilayer composites or blends of polyethylene (PE) and polypropylene (PP). However, other types of permeable membranes and materials can be used.

The anode 112 is preferably pure elemental lithium, but may contain incidental impurities less than 2 mole percent. The anode 112 may originate as a seed layer on the second portion 108 when fabricated. When fabricated as the seed layer, the anode 112 has a thickness greater than the seal 120, if present, and is fabricated to contact the first portion 106. FIGS. 1A & 1B depict the anode 112 in corresponding states of operation different than the as-fabricated state (i.e., not as the seed layer).

During the charging and discharging processes, the anode 112 expands and contracts in volume. FIG. 1A illustrates the lithium-metal battery 100 during the charging process when the anode 112 is plated with lithium metal to expand in volume. Such plating occurs at the interface with the second portion 108. An expansion of the anode 112 is shown in FIG. 1A by arrows 126. FIG. 1B illustrates the lithium-metal battery 100 during the discharging process when the anode 112 is stripped to contract in volume. Such stripping occurs at the interface with the second portion 108. A contraction of the anode 112 is shown in FIG. 1B by arrows 128.

The enclosed cavity 110 is configured such that volumetric expansion and contraction of the anode 112 is accommodated entirely within. This configuration may utilize a cavity geometry that guides expansion and contraction along the longitudinal axis 114. The enclosed cavity 110 may also be larger than that occupied by the anode 112 at maximum expansion. It will be appreciated that, by accommodating all volumes of the anode 112 during charging and discharging, the enclosed cavity 110 can allow outer dimensions of the anode cell 102 to remain virtually constant.

In some embodiments, the enclosed cavity 110 exhibits a vacuum of magnitude less than 100 torr. In some embodiments, the enclosed cavity 110 exhibits a vacuum of magnitude less than 10 torr. In some embodiments, the enclosed cavity 110 exhibits a vacuum of magnitude less than 1 torr. In some embodiments, the enclosed cavity 110 exhibits a vacuum of magnitude less than $10^{-1}$ torr.

In some embodiments, the enclosed cavity 110 includes a gas disposed therein. In such embodiments, the gas is inert to reaction with lithium metal. Non-limiting examples of the gas include helium, neon, argon, krypton, xenon, and combinations thereof. Other inert gases and their combinations are possible. The gas in the enclosed cavity 110 may exhibit a reduced pressure of magnitude less than one atmosphere (i.e., <760 torr).

In various embodiments, the lithium-metal battery 100 includes a cathode cell 130. The cathode cell 130 is electrochemically-coupled to the anode cell 102, which may occur through the permeable membrane 122. The cathode cell 130 may be any cathode cell that utilizes lithium ions as a basis for electrochemical operation.

In some embodiments, the cathode cell 130 includes a cathode active material 132 in contact with the permeable membrane 122 along an area 134 opposite the orifice 116. The area 134 may be bounded by the perimeter 118 of the orifice 116, i.e., a projection of the perimeter 118 through the permeable membrane 122. Non-limiting examples of the cathode active material 132 include compositions of lithium transition-metal (M) oxide such as $LiMO_2$, $LiM_2O_4$, and $LiMPO_4$. M can represent Ni, Co, Mn, or any combination thereof. Other compositions, however, are possible for the cathode active material 132.

The cathode cell 130 may also include an electrolyte 136 comprising at least one solvated lithium species. The at least one solvated lithium species may include a lithium salt. Non-limiting examples of the lithium salt include $LiPF_6$, $LiBF_4$, $LiClO_4$, $LiSO_3CF_3$, $LiN(SO_2CF_3)_2$, $LiBC_4O_8$, $Li[PF_3(C_2CF_5)_3]$, and $LiC(SO_2CF_3)_3$. Other lithium salts are possible, including combinations of lithium salts. The electrolyte 136 permeates the cathode active material 132 and the permeable membrane 122 (if present). During operation of the lithium-metal battery 100, the electrolyte 136 provides a medium through which lithium ions are exchanged between the second portion 108 and the cathode active material 132.

The cathode cell 130 may additionally include a cathode current collector 138 in contact with the cathode active material 132. The cathode current collector 138 is formed of an electrically-conductive material that is chemically stable to the cathode active material 132 and the electrolyte 136. Such chemical stability also includes chemical stability of the electrolyte 136 towards the cathode current collector 138. Non-limiting examples of the electrically-conductive material include aluminum, aluminum alloys, and carbonaceous materials (e.g., graphite). Other conductive materials, however, are possible. FIGS. 1A & 1B depict the cathode current collector 138 as being a foil or sheet. However, this depiction is for purposes of illustration only. The current collector 138 may exhibit other shapes, including being integrated into a housing of the lithium-metal battery 100.

In some embodiments, the electrolyte 136 includes a liquid solvent. In such embodiments, the liquid solvent may be an organic carbonate (e.g., ethylene carbonate, dimethyl carbonate, diethyl carbonate, ethyl-methyl carbonate, etc.), an ionic liquid (e.g., 1-butyl-3-methylimidazolium hexafluorophosphate, 1-ethylpyridinium tetrafluoroborate, etc.), or some combination thereof. Other liquid solvents and their combinations are possible. In some embodiments, the electrolyte 136 includes a gel polymer. In these embodiments, the gel polymer may include polymeric hosts such as polyethylene oxide (PEO), polyacrylonitrile (PAN), polymethylmethacrylate (PMMA), and polyvinylidene fluoride (PVdF). Other gel polymers are possible.

It will be appreciated that the second portion 108 allows an interface between the anode cell 102 and the cathode cell 130 that separates the anode 112 from the electrolyte 136. Such separation is advantageous given that the anode 112 comprises lithium metal. Many useful formulations of electrolyte 136 are unstable towards lithium metal, and if incorporated within the lithium-metal battery 100 in direct contact with the anode 112, would decompose during charging and discharging. Separation of the anode 112 from the electrolyte 136 may also prevent a formation of lithium-metal dendrites, which can traverse the electrolyte 136 to form a short-circuit pathway between the anode cell 102 and the cathode cell 130 (e.g., between the anode 112 and the cathode current collector 138).

In some embodiments, the second portion 108 of the anode cell 102 directly contacts the cathode active material 132 of the cathode cell 130 (i.e., the permeable membrane 122 depicted in FIGS. 1A-1C is not present). In these embodiments, the cathode active material 132 extends along the exterior surface 124 to portions of the second portion 108 not immediately opposite the orifice 116 (e.g., opposite the seal 120). For example, and without limitation, the cathode active material 132 may extend to cover the exterior surface 124 in its entirety.

In operation, the lithium-metal battery 100 undergoes battery cycling that involves the charging and discharging processes. During the charging process, a charging electrical current flows through the first portion 106 of the container 104 and into the anode 112, which is in contact with the container 104. The charging electrical current originates at the cathode current collector 138 and reaches the container 104 via an electrical circuit (not shown). The charging electrical current is provided by an electrical power source, which may be regulated by the electrical circuit (e.g., to produce controlled voltage).

The charging electrical current induces positively-charged lithium ions to migrate from the cathode active material 132, through the permeable membrane 122 (if present), and to the second portion 108. Such migration proceeds through the electrolyte 136, which contains the at least one lithium species solvated therein. At the second portion 108, the positively-charged lithium ions diffuse therethrough to reach the anode 112, where they neutralize a negative charge being supplied by the charging electrical current. This diffusion causes layers of lithium metal to plate onto the anode 112 at the interface with the second portion 108. The anode 112 then expands volumetrically within the enclosed cavity 110 (see arrows 126 in FIG. 1A). The enclosed cavity 110 is sufficient in shape and size to accommodate the anode 112 at maximum expansion. The enclosed cavity 110 may include an excess volume as a margin of safety.

During the discharging process, the anode 112 strips at the interface to produce positively-charged lithium ions. Such mass loss causes the anode 112 to contract volumetrically within the enclosed cavity 110 (see arrows 128 in FIG. 1B). The positively-charged lithium ions diffuse through the second portion 108 where they are solvated by the electrolyte 136. Transport through the electrolyte 136 allows the positively-charged lithium ions to reach the cathode active material 132, where they are stored therein (e.g., via an intercalation process). In response, a discharging electrical current flows out of the first portion 106 of the container 104, through the electrical circuit, and to the cathode current collector 138. The electrical circuit may allow the discharging electrical current to power an electronic device or electric-power consuming apparatus. Upon reaching the cathode current collector 138, the discharging electrical current flows into the cathode active material 132, where it neutralizes the positively-charged lithium ions being stored.

Because all volumes associated with the anode 112 are contained within the enclosed cavity 110, outer dimensions of the anode cell 102 remain virtually constant. Thus, the lithium-metal battery 100 exhibits an improved dimensional stability during operation. Moreover, the second portion 108 of the container 104 and the seal 120 allow the anode 112 to remain separated from an environment of the anode cell 102, which includes separation from the electrolyte 136. Such separation is advantageous when using formulations of electrolyte 136 that are reactive towards lithium metal. The second portion 108 serves as an ionic conductor that mediates chemically between the anode 112 and the electrolyte 136. In some embodiments, the second portion 108 is assisted by the permeable membrane 122, which resides on the exterior surface 124 of the second portion 108 and is exposed to the electrolyte 136.

It will be appreciated that the lithium-metal battery 100 described in relation to FIGS. 1A-1C can be incorporated into a battery pack. The battery pack includes at least one lithium-metal battery 100 having an anode cell 102 electrochemically-coupled to a cathode cell 130. The at least one lithium-metal battery 100 may be electrically coupled in series, in parallel, or any combination thereof. In various embodiments of the battery pack, the at least one lithium-metal battery 100 includes a stacked sequence of lithium-metal batteries 100. In some of these embodiments, the at least one lithium-metal battery 100 lacks the permeable membrane 122, i.e., the second portion 108 of the anode cell 102 directly contacts the cathode active material 132 of the cathode cell 130.

Figure 2A:
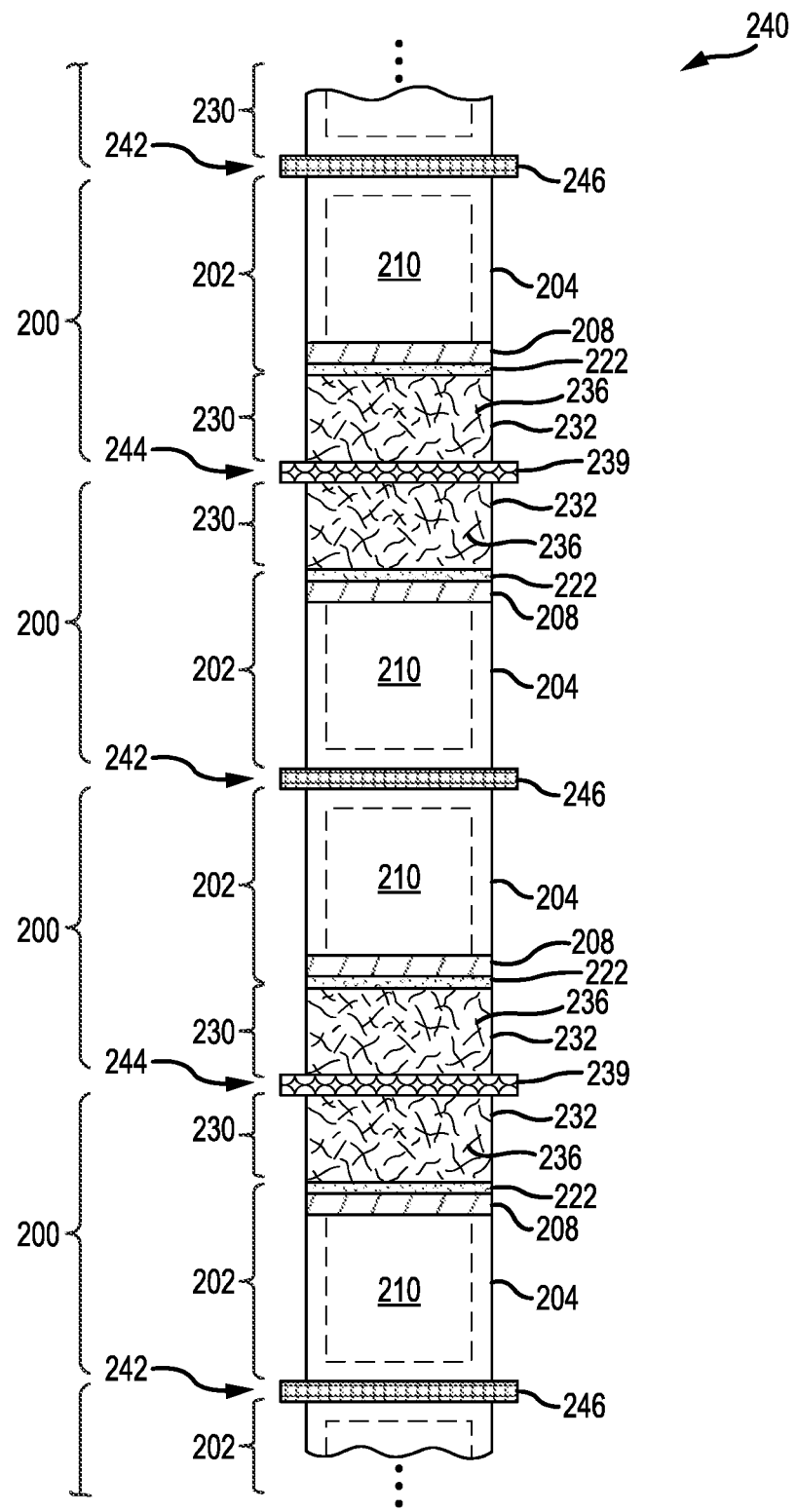
FIG. 2A is a schematic diagram of a plurality of lithium-metal batteries arranged in a stacked sequence, according to an illustrative embodiment.

FIG. 2A presents a schematic diagram of a plurality of lithium-metal batteries 240 arranged in a stacked sequence, according to an illustrative embodiment. Features analogous to FIGS. 1A-1C and FIG. 2A are related via coordinated numerals that differ in increment by one hundred. Dashed lines shown a shape of the enclosed cavity 210. The stacked sequence alternates between a first junction 242 formed by adjacent pairs of anode cells 202 and a second junction 244 formed by adjacent pairs of cathode cells 230.

In some embodiments, the first junction 242 includes a common anode current collector 246 shared between adjacent pairs of anode cells 202, as shown in FIG. 2A. Such sharing may involve a "U-shaped" cross-section. In some embodiments, the first junction 242 includes a container wall shared in common between the corresponding first portions of adjacent pairs of anode cells 202 (e.g., an "H-shaped" cross-section in FIGS. 1A-1C). In these embodiments, such sharing may allow the corresponding first portions to function in combination as a single, extended anode current collector. In some embodiments, the second junction 244 includes a common cathode current collector 239 shared between adjacent pairs of cathode cells 230, as shown in FIG. 2A.

Figure 2B:
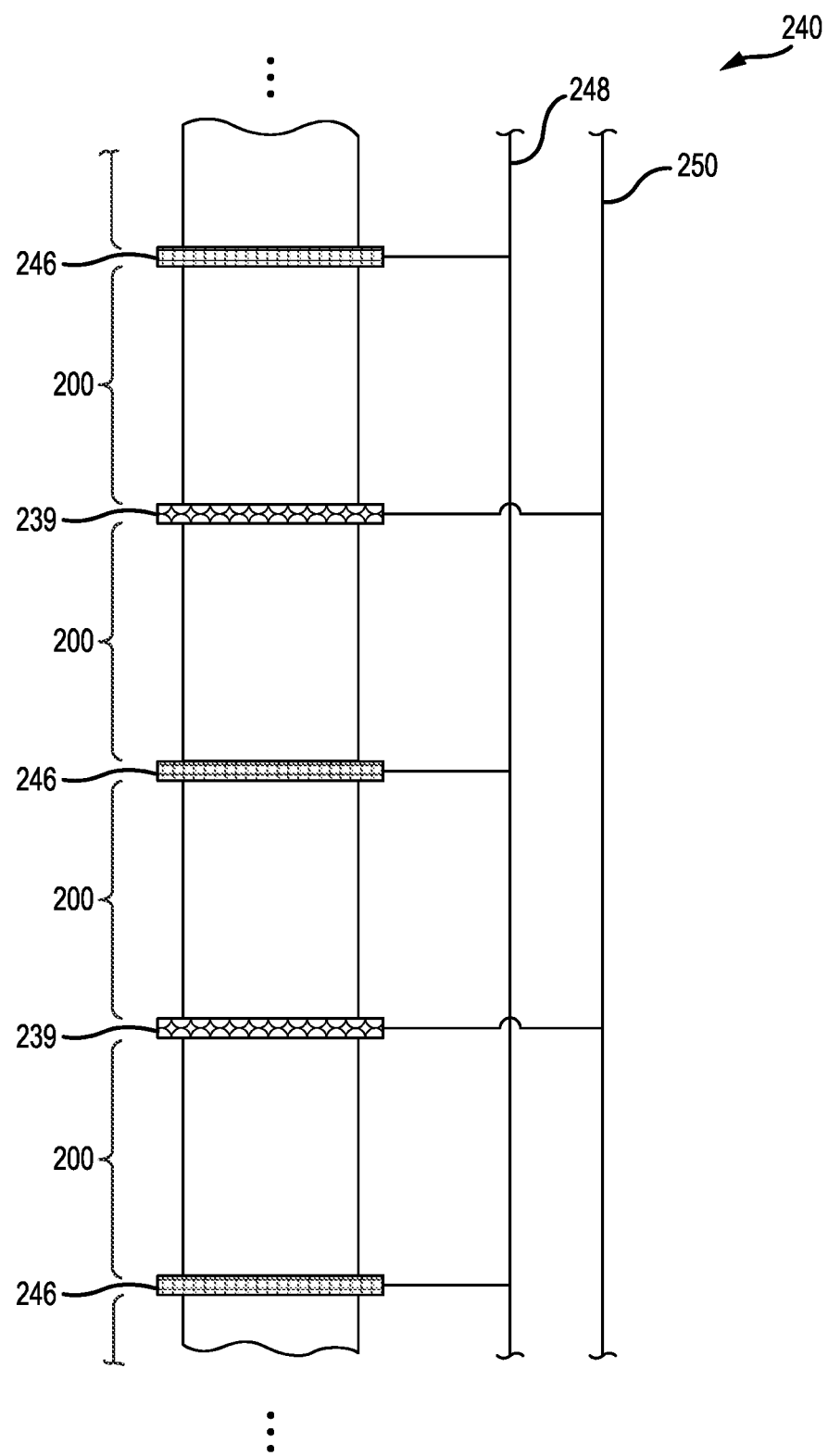
FIG. 2B is a schematic diagram of the stacked sequence of FIG. 2A, but in which the stacked sequence is electrically coupled in parallel, according to an illustrative embodiment.

It will be appreciated that the common anode current collectors 246 and the common cathode current collectors 239 can be electrically coupled in parallel, in series, or any combination thereof. FIG. 2B presents the stacked sequence of FIG. 2A, but electrically coupled in parallel, according to an illustrative embodiment. In FIG. 2B, the common anode current collectors 246 are electrically-coupled to an anode bus 248 and the common cathode current collectors 239 are electrically-coupled to a cathode bus 250. The anode bus 248 and the cathode bus 250 may correspond to terminals of the battery pack. A voltage potential between the anode bus 248 and the cathode bus 250 may be constant. However, electrical current flowing between the buses 248, 250 scales with a number of lithium-metal batteries 200 so-coupled.

Figure 2C:
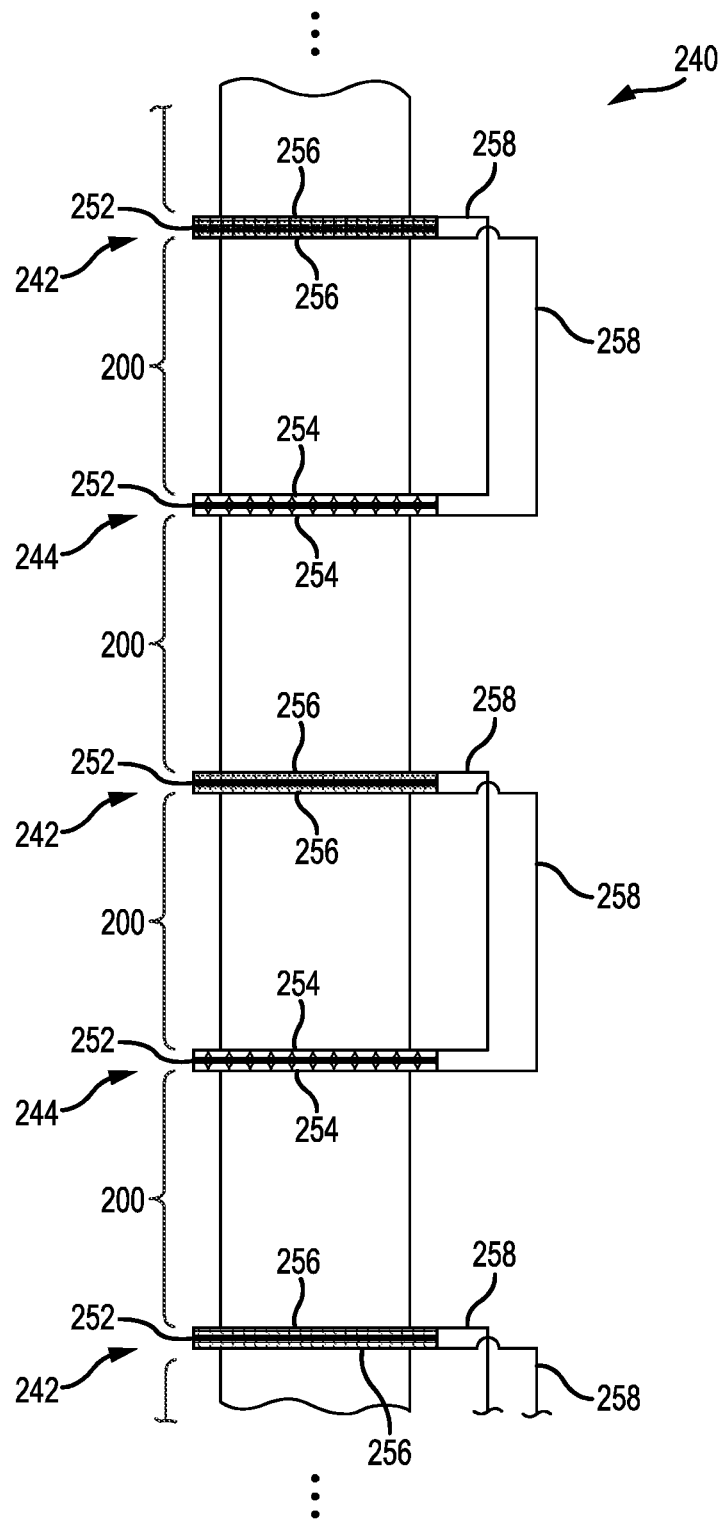
FIG. 2C is a schematic diagram of the stacked sequence of FIG. 2A, but in which the stacked sequence is electrically coupled in series, according to an illustrative embodiment.

FIG. 2C presents the stacked sequence of FIG. 2A, but electrically coupled in series, according to an illustrative embodiment. In FIG. 2C, insulating elements 252 are disposed between cathode current collectors 254 and anode current collectors 256 associated with individual lithium-metal batteries 200. The insulating elements 252 prevent electrical current from flowing between adjacent lithium-metal batteries 200 (i.e., flowing through the first and second junctions 242, 244). Conducting elements 258 electrically-couple the cathode current collectors 254 to the anode current collectors 256 along the stacked sequence. Such coupling allows a potential voltage of the stacked sequence to scale with a number of lithium-metal batteries therein. Electrical current along the stacked sequence may be constant.

Figure 2D:
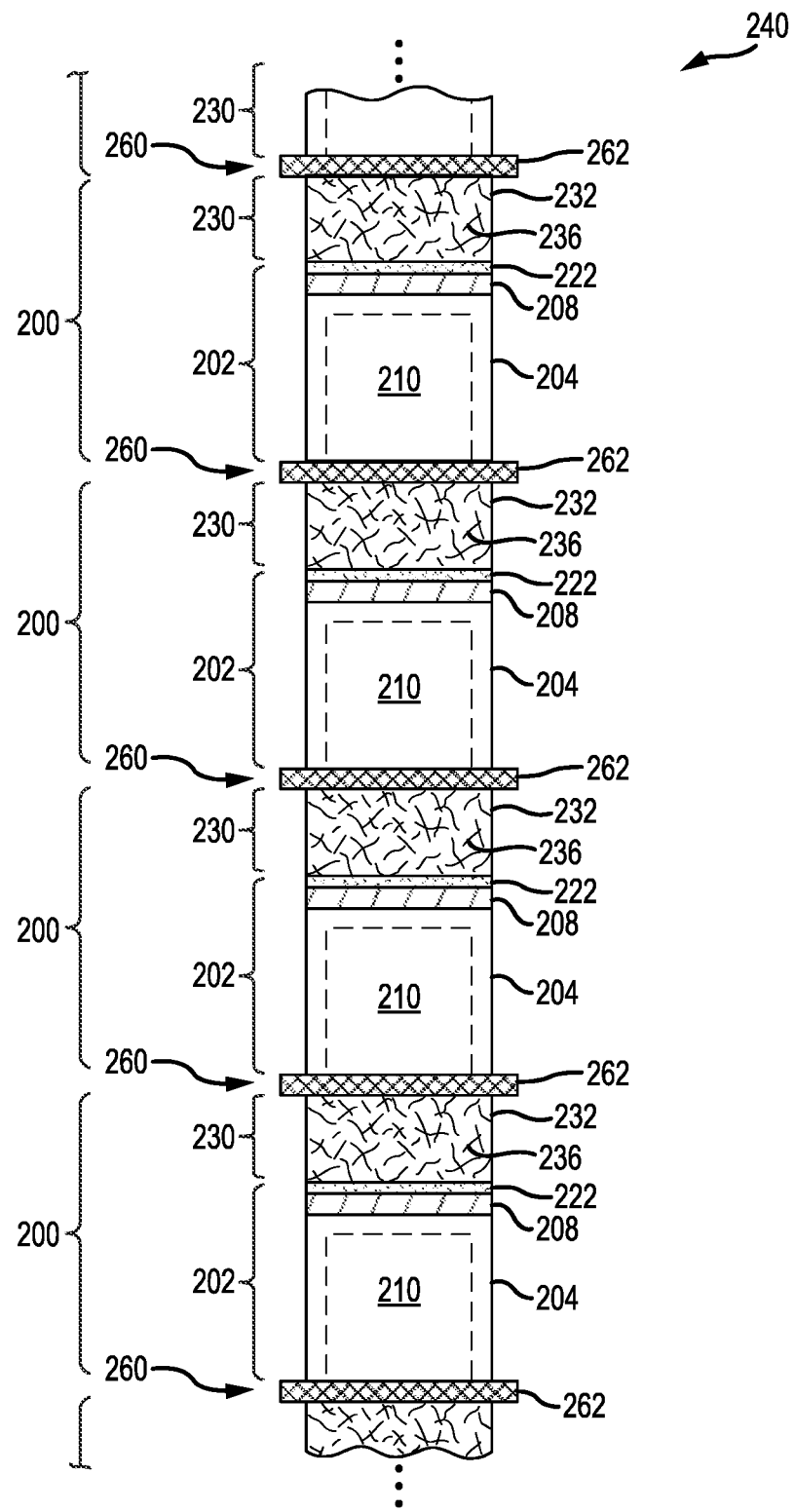
FIG. 2D is a schematic diagram of the stacked sequence of FIG. 2A, but in which the stacked sequence includes lithium-metal batteries having aligned polarities, according to an illustrative embodiment.

A series electrical coupling may also be achieved by altering an arrangement of lithium-metal batteries 200 within the stacked sequence. FIG. 2D presents the stacked sequence of FIG. 2A, but in which individual lithium-metal batteries 200 of the stacked sequence have aligned polarities. In this alignment, anode cells 202 and cathode cells 230 meet in pairs to form a third junction 260. In some instances, such as that shown in FIG. 2D, the third junction 260 contains a shared current collector 262. The shared current collector 262 is stable to electrochemical processes within the anode cell 202 and the cathode cell 230 (e.g., formed of TiAlN or TiAlN-coated stainless steel). In some variations, the shared current collector 262 includes an anode current collector (e.g., copper foil) on one side and a cathode current collector (e.g., aluminum foil) on an opposite side. The anode current collector and the cathode current collector do not react with each other during operation and are inert when the lithium-metal batteries 200 are inactive.

Referring now back to FIGS. 1A-1C, the battery pack may also involve arrays. In various embodiments, the at least one lithium-metal battery 100 includes an array of lithium-metal batteries 100. The first portion 106 of the container 104 for each lithium-metal battery 100 may define a section of an extended first portion shared in common. Non-limiting examples of the extended first portion are described below in relation to FIG. 3 and FIG. 4.

Figure 3:
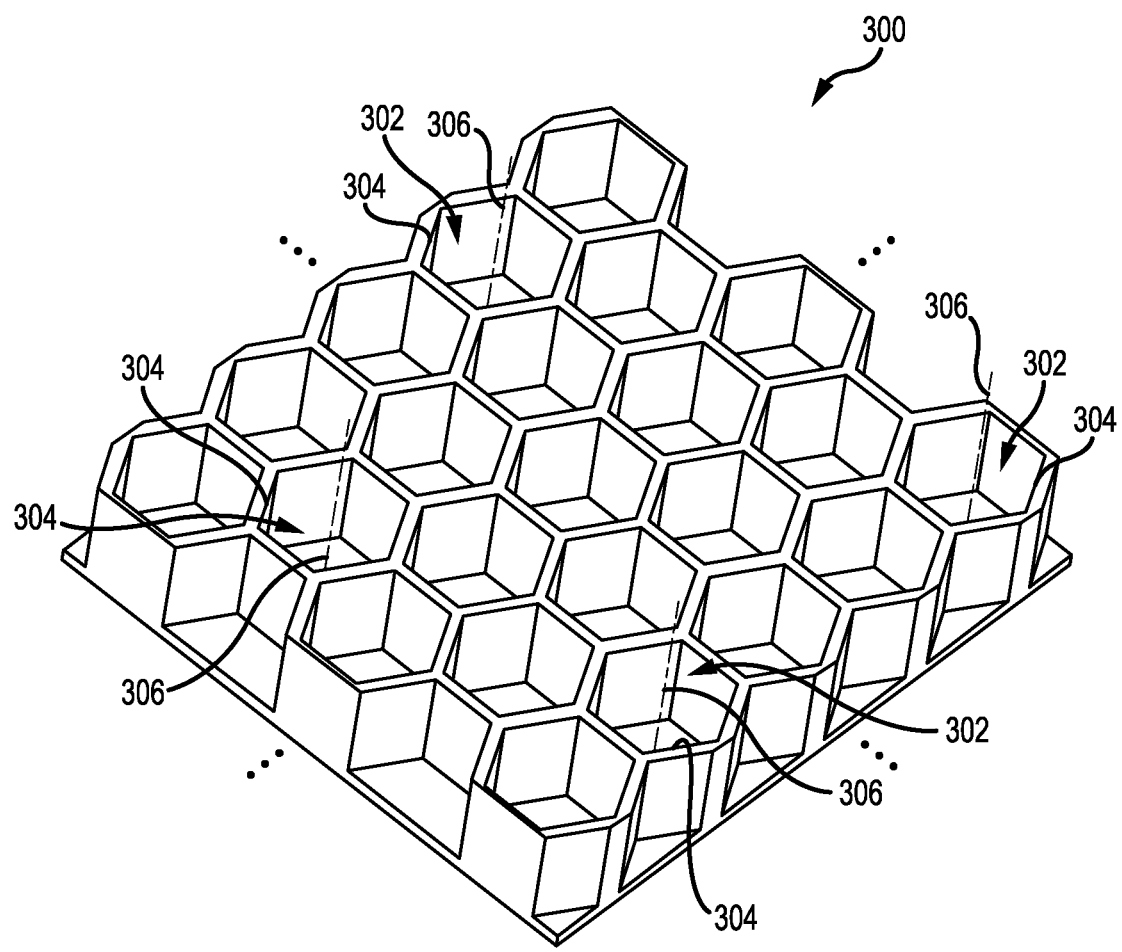
FIG. 3 is a perspective view of part of an extended first portion having cavities with corresponding orifices on a common side, according to an illustrative embodiment.

FIG. 3 presents a perspective view of part of an extended first portion 300 having cavities 302 with corresponding orifices 304 on a common side, according to an illustrative embodiment. Although the cavities 302 are depicted as having a hexagonal cross-section and longitudinal axes 306 aligned in parallel, this depiction is not intended as limiting. Other cross-sections and alignments are possible. For example, and without limitation, cross-sections for the cavities 302 can include square cross-sections, circular cross-sections, and rectangular cross-sections. The cavities 302 may also be canted relative to each other to form patterns (e.g., peaks, valleys, clusters, etc.). Moreover, the cavities 302 need not be ordered along a hexagonal array, as shown in FIG. 3. Other arrays are possible (e.g., rectangular).

Figure 4:
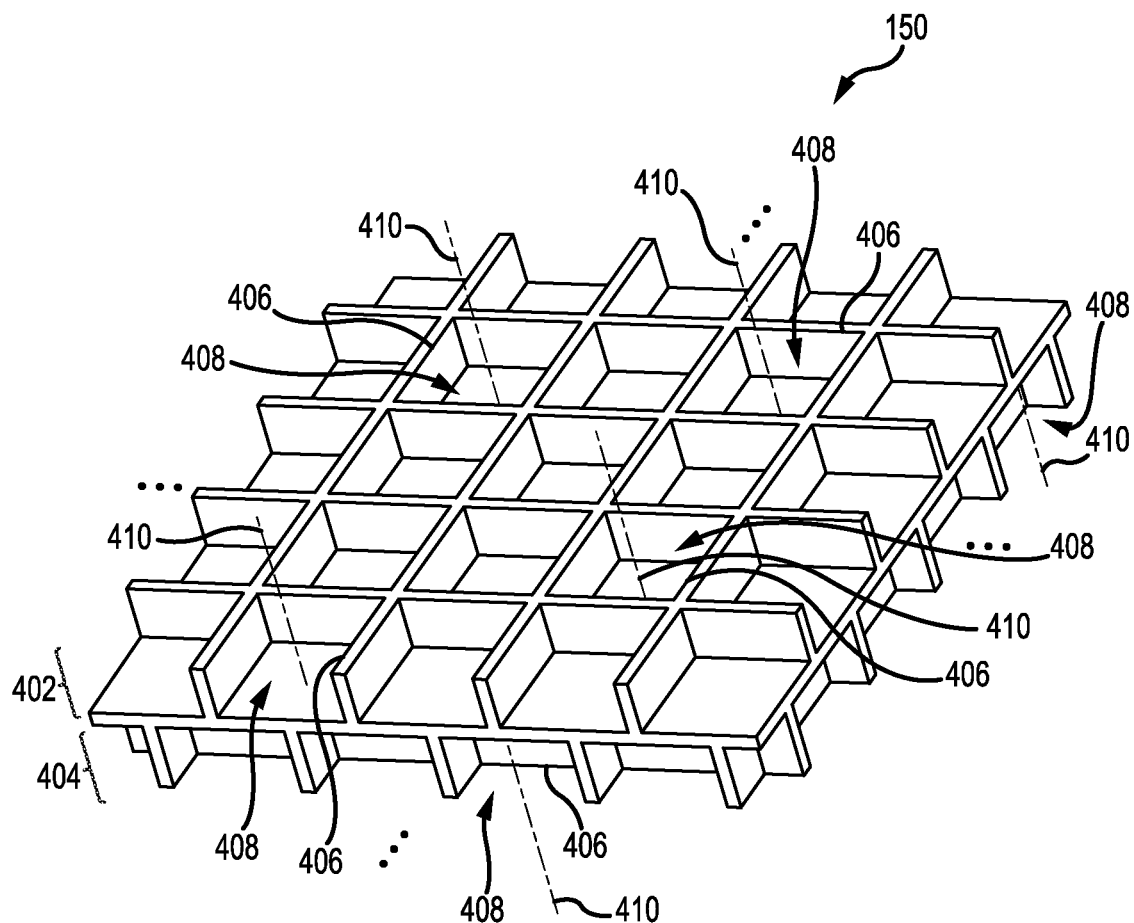
FIG. 4 is a perspective view of part of an extended first portion having a first planar array of cavities opposite a second planar array of cavities, according to an illustrative embodiment.

FIG. 4 presents a perspective view of part of an extended first portion 400 having a first planar array of cavities 402 opposite a second planar array of cavities 404, according to an illustrative embodiment. The corresponding orifices 406 open on opposite sides of the extended first portion 400. The corresponding cavities 408 are ordered along a square (or rectangular) array. However, it will be understood that the cavities 408 of the arrays 402, 404 may be ordered in any type of planar ordering (e.g., hexagonal).

In FIG. 4, the first planar array of cavities 402 is depicted as being offset laterally relative to the second planar array of cavities 404. However, this depiction is for purposes of illustration only. The cavities 408 of each planar array 402, 404 may be aligned such that cavities 408 on opposite sides share a common longitudinal axis between adjacent pairs. The cavities 408 of FIG. 4 are also depicted with a common square cross-section and longitudinal axes 410 aligned in parallel. However, other cross-sections (e.g., circular, hexagonal, etc.) and alignments (e.g., canted) are possible. These cross-sections and alignments may also differ between arrays 402, 404 and between individual cavities 408 within an array.

Now referring back to FIGS. 1A-1C, in embodiments involving the extended first portion, the array of lithium-metal batteries 100 may be oriented such that the corresponding enclosed cavities 110 have orifices 116 on a common side of the extended first portion (e.g., analogous to FIG. 3). In these instances, the corresponding cathode cells 130 may be configured into a single, effective cathode cell that spans the extended first portion. Such configuration may include the cathode active material 132 and the cathode current collector 138 as single respective layers that extend to limits of the extended first portion. The second portion 108 and the permeable membrane 122 may also be single respective layers that extend to limits of the extended first portion. Thus, the array of lithium-metal batteries 100 may include a single cathode cell that is shared in common among a plurality of anode cells 102.

The array of lithium-metal batteries 100 may also include a first planar array of lithium-metal batteries 100 opposite a second planar array of lithium-metal batteries 100. The corresponding enclosed cavities 110 are oriented such that their orifices 116 open on opposite sides of the extended first portion (e.g., analogous to FIG. 4). In such instances, the cathode cells 130 associated with each side may be configured into a single, effective cathode cell. Thus, the array of lithium-metal batteries 100 may include a single cathode cell on each side of the extended first portion. The single cathode cell may extend to limits of the extended first portion and may be shared in common among anode cells 102 on one side. The second portion 108 and the permeable membrane 122 may also be configured as single respective layers that extend to limits of the extended first portion on one or both sides.

The anode cells, the lithium-metal batteries, and the battery packs described herein can be used in any device that requires rechargeable or non-rechargeable batteries. In some variations, the anode cells, lithium-metal batteries, and the battery packs described herein can be packaged in to an apparatus that is battery-powered.

According to an illustrative embodiment, a method of manufacturing a lithium-metal battery includes the step of depositing a seed layer of lithium metal onto a surface of a substrate (e.g., by vacuum deposition, electroplating, etc.). The seed layer covers a predetermined area of the surface, which matches an orifice of a cavity within an electrically-conductive container. The substrate includes a solid-state lithium-ion conductor. The method also includes the step of coupling the electrically-conductive container to the substrate so as to enclose the seed layer within the cavity. Such enclosure includes the seed layer being seated within a perimeter of the orifice. The seed layer is in contact with the electrically-conductive container. In some embodiments, the step of coupling the electrically-conductive container to the substrate includes sealing the electrically-conductive container to the substrate.

It will be appreciated that the perimeter of the orifice matches that of the predetermined area. Thus, the seed layer, when enclosed within the cavity, has a boundary that aligns with the perimeter of the orifice. This alignment allows the seed layer to be in contact with the electrically-conductive container. In some embodiments, the electrically-conductive container is coupled to the substrate via a seal. The seal may be a hermetic seal. In these embodiments, the seed layer has a minimum thickness that is greater than a distance separating the electrically-conductive container from the substrate (e.g., a seal thickness). The minimum thickness may prevent a gap between the seed layer and the electrically-conductive container.

Non-limiting examples of the solid-state lithium-ion conductor include a lithium phosphorus oxynitride material (e.g., LiPON), a lithium boron oxynitirde material (e.g. LiBON), a lithium boron oxide material (e.g., $LiBO_3$), a lithium niobium oxide material (e.g., $LiNbO_3$), a lithium lanthanum zirconium oxide material (e.g., $Li_7La_3Zr_2O_{12}$), a lithium phosphorus sulfide material (e.g., $Li_3PS_4$), a lithium tin sulfide material (e.g., $Li_4SnS_4$), and a lithium germanium phosphorus sulfide material (e.g., $Li_{10}GeP_2S_{12}$). Other solid-state lithium-ion conductors are possible. In some embodiments, the solid-state ionic conductor has a lithium-ion conductivity greater than $10^{-7}$ S/cm. In some embodiments, the solid-state ionic conductor includes a lithium phosphorus oxynitride material. The lithium phosphorus oxynitride material may have a stoichiometry of $Li_xPO_yN_z$ where $3.0 \leq x \leq 3.8$, $3.0 \leq y \leq 4.0$, and $0.1 \leq z \leq 1.0$. The lithium phosphorus oxynitride material may be amorphous.

In some embodiments, the method further includes the step of depositing the solid-state lithium-ion conductor on a removable support (e.g., by vacuum deposition, electroplating, etc.). The removable support can be removed from the solid-state lithium-ion conductor before or after the substrate is coupled to electrically-conductive container. In some instances, the removable support is detached physically from the solid-state lithium-ion conductor. In other instances, the removable support is removed from the solid-state lithium-ion conductor through one or more sacrificial processes (e.g., dissolving in a solvent, melting, heating to decompose, etc.).

In some embodiments, the step of depositing the seed layer of lithium metal includes the step of depositing the solid-state lithium-ion conductor onto a cathode active material (e.g., by vacuum deposition, heat-molding, etc.). In these embodiments, the cathode active material may be configured as part of a cathode cell.

In some embodiments, the step of depositing the seed layer of lithium metal includes the step of depositing the solid-state lithium-ion conductor onto a permeable membrane having a first surface and a second surface. In these embodiments, the first surface forms an interface with the solid-state lithium-ion conductor. An exposed surface of the solid-state lithium-ion conductor defines the first side of the substrate. The substrate further includes the permeable membrane.

The permeable membrane may be any type of permeable membrane configured to transport lithium-ions therethrough, including separators for lithium-ion batteries. In some embodiments, the permeable membrane exhibits a mean pore diameter less than 0.8 μm. Non-limiting examples of the permeable membrane include polymer membranes of polyethylene (PE) and polypropylene (PP). Such polymer membranes may also include multilayer composites or blends of polyethylene (PE) and polypropylene (PP). However, other types of permeable membranes and materials can be used.

In some embodiments, the step of depositing the solid-state lithium-ion conductor onto the permeable membrane includes the step of contacting a cathode active material with a cathode current collector to produce a preform. In such embodiments, the step of depositing the solid-state lithium-ion conductor onto the permeable membrane also includes the step of contacting the cathode active material of the preform with the second surface of the permeable membrane and the step of applying heat, pressure, or a combination thereof, to the preform in contact with the permeable membrane. The substrate further includes the cathode active material and the cathode current collector.

Non-limiting examples of the cathode active material include compositions of lithium transition-metal (M) oxide such as $LiMO_2$, $LiM_2O_4$, and $LiMPO_4$. M can represent Ni, Co, Mn, or any combination thereof. Other compositions, however, are possible for the cathode active material. The cathode current collector may be formed of an electrically-conductive material such as aluminum, aluminum alloys, and carbonaceous materials (e.g., graphite). Other electrically-conductive materials, however, are possible. The cathode current collector may be a foil or sheet.

In some embodiments, the step of coupling the electrically-conductive container to the substrate includes the step of coupling an anode terminal to the electrically-conductive container and the step of coupling the cathode terminal to the cathode current collector. In further embodiments, the step of coupling the electrically-conductive container to the substrate includes the step of disposing, into a pouch, the electrically-conductive container coupled to the substrate; the step of filling the pouch with an electrolyte; and the step of sealing the pouch.

The anode terminal may be formed of any electrically-conductive material chemically compatible with the electrically-conductive material. Similarly, the cathode terminal may be formed of any electrically-conductive material chemically compatible with the cathode current collector.

The electrolyte includes at least one solvated lithium species. The at least one solvated lithium species may include a lithium salt. Non-limiting examples of the lithium salt include $LiPF_6$, $LiBF_4$, $LiClO_4$, $Li\,SO_3CF_3$, $LiN(SO_2CF_3)_2$, $LiBC_4O_8$, $Li[PF_3(C_2CF_5)_3]$, and $LiC(SO_2CF_3)_3$. Other lithium salts are possible, including combinations of lithium salts. The electrolyte may permeate the cathode active material and the permeable membrane (if present). The electrolyte may also include a liquid solvent. The liquid solvent may be an organic carbonate (e.g., ethylene carbonate, dimethyl carbonate, diethyl carbonate, ethyl-methyl carbonate, etc.), an ionic liquid (e.g., 1-butyl-3-methylimidazolium hexafluorophosphate, 1-ethylpyridinium tetrafluoroborate, etc.), or some combination thereof. Other liquid solvents and their combinations are possible. In some embodiments, the electrolyte includes a gel polymer. In these embodiments, the gel polymer may include polymeric hosts such as polyethylene oxide (PEO), polyacrylonitrile (PAN), polymethylmethacrylate (PMMA), and polyvinylidene fluoride (PVdF). Other gel polymers are possible.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An anode cell comprising:
   a container having a first portion and at least two second portions to form at least two enclosed cavities, the first portion electrically-conductive and chemically-stable to lithium metal, each of the second portions permeable to lithium ions and chemically-stable to lithium metal, wherein each of the second portions forms a single wall of one of the at least two enclosed cavities and the first portion forms each of the other walls of each of the at least two enclosed cavities, and wherein the single wall of each of the at least two enclosed cavities is perpendicular to a longitudinal axis of the corresponding enclosed cavity;

an anode comprising lithium metal and disposed within each of the at least two enclosed cavities;

wherein each of the at least two enclosed cavities is configured such that volumetric expansion and contraction of the corresponding anode along the longitudinal axis of the enclosed cavity during charging and discharging is accommodated entirely therein;

wherein a volume of each of the at least two enclosed cavities along the longitudinal axis is larger in size than a volume of the corresponding anode disposed therein;

wherein the at least two second portions separate each of the anodes from an electrolyte disposed external to each of the at least two enclosed cavities; and wherein the electrolyte comprises a lithium salt.

2. The anode cell of claim 1, wherein each of the at least two second portions comprises a lid for the first portion.

3. The anode cell of claim 1, wherein each of the at least two second portions comprises a multilayer stack.

4. The anode cell of claim 1, wherein each of the at least two enclosed cavities has a cross-sectional area that is constant along a longitudinal axis thereof.

5. The anode cell of claim 4, wherein each of the at least two enclosed cavities comprises an orifice having a perimeter that defines the cross-sectional area.

6. The anode cell of claim 5, further comprising a permeable membrane disposed along an exterior surface of at least one of the at least two second portions and opposite at least one of the orifices.

7. The anode cell of claim 5, wherein each of the at least two second portions is coupled to the first portion via a seal around the perimeter of one of the orifices.

8. The anode cell of claim 1, wherein the lithium salt comprises at least one of $LiPF_6$, $LiBF_4$, $LiClO_4$, $LiSO_3CF_3$, $LiN(SO_2CF_3)_2$, $LiBC_4O_8$, $Li[PF_3(C_2CF_5)_3]$, and $LiC(SO_2CF_3)_3$.

9. The anode cell of claim 1, wherein each of the at least two second portions comprises at least one of a lithium phosphorus oxynitride material, a lithium boron oxynitride material, a lithium boron oxide material, a lithium niobium oxide material, a lithium lanthanum zirconium oxide material, a lithium phosphorus sulfide material, a lithium tin sulfide material, and a lithium germanium phosphorus sulfide material.

10. A battery pack, comprising:
at least one lithium-metal battery having an anode cell electrochemically coupled to a cathode cell, the anode cell comprising:
  a container having a first portion and at least two second portions to form at least two enclosed cavities, the first portion electrically-conductive and chemically-stable to lithium metal, each of the second portions permeable to lithium ions and chemically-stable to lithium metal, wherein each of the second portions forms a single wall of one of the at least two enclosed cavities and the first portion forms each of the other walls of each of the at least two enclosed cavities, and wherein the single wall of each of the at least two enclosed cavities is perpendicular to a longitudinal axis of the corresponding enclosed cavity;

an anode comprising lithium metal and disposed within each of the at least two enclosed cavities;

wherein each of the at least two enclosed cavities is configured such that volumetric expansion and contraction of the corresponding anode along the longitudinal axis of the enclosed cavity during charging and discharging is accommodated entirely therein;

wherein a volume of each of the at least two enclosed cavities along the longitudinal axis is larger in size than a volume of the corresponding anode disposed therein;

wherein the at least two second portions separate each of the anodes from an electrolyte disposed external to each of the at least two enclosed cavities; and wherein the electrolyte comprises a lithium salt.

11. The battery pack of claim 10,
wherein each of the at least two enclosed cavities comprises an orifice having a perimeter; and
wherein the anode cell further comprises at least one permeable membrane disposed along an exterior surface of at least one of at least two the second portions and opposite at least one of the orifices.

12. The battery pack of claim 11, wherein at least one of the at least two second portions of the container is coupled to the first portion of the container via a seal around the perimeter of the orifice.

13. The battery pack of claim 11, wherein the cathode cell comprises:
a cathode active material in contact with the at least one permeable membrane along an area opposite the at least one orifice; and
a cathode current collector in contact with the cathode active material.

14. The battery pack of claim 10,
wherein the at least one lithium-metal battery comprises a plurality of lithium-metal batteries arranged in a stacked sequence; and
wherein the stacked sequence alternates between a first junction formed by adjacent pairs of anode cells and a second junction formed by adjacent pairs of cathode cells.

15. The battery pack of claim 14,
wherein the at least one lithium-metal battery comprises the plurality of lithium-metal batteries arranged in the stacked sequence; and
wherein individual lithium-metal batteries within the stacked sequence have aligned polarities.

16. The battery pack of claim 10,
wherein the at least one lithium-metal battery comprises an array of lithium-metal batteries; and
wherein the first portion of the container for each lithium-metal battery defines a section of an extended first portion shared in common.

17. The battery pack of claim 10, wherein the lithium salt comprises at least one of $LiPF_6$, $LiBF_4$, $LiClO_4$, $LiSO_3CF_3$, $LiN(SO_2CF_3)_2$, $LiBC_4O_8$, $Li[PF_3(C_2CF_5)_3]$, and $LiC(SO_2CF_3)_3$.

18. The battery pack of claim 10, wherein each of the at least two second portions comprises at least one of a lithium phosphorus oxynitride material, a lithium boron oxynitride material, a lithium boron oxide material, a lithium niobium oxide material, a lithium lanthanum zirconium oxide material, a lithium phosphorus sulfide material, a lithium tin sulfide material, and a lithium germanium phosphorus sulfide material.

* * * * *